(12) United States Patent
Hong et al.

(10) Patent No.: US 12,649,443 B2
(45) Date of Patent: Jun. 9, 2026

(54) TIRE MAINTENANCE METHOD AND TIRE MAINTENANCE KIT

(71) Applicant: ACTIVE TOOLS INTERNATIONAL (HK) LTD., Causeway Bay (HK)

(72) Inventors: Wesley Jui Hung Hong, Causeway Bay (HK); Koon Fung Lam, Tuen Mun (HK); Wai Kwong Ching, Tuen Mun (HK); Huilong Ji, Causeway Bay (HK)

(73) Assignee: ACTIVE TOOLS INTERNATIONAL (HK) LTD., Causeway Bay (HK)

( * ) Notice: Subject to any disclaimer, the term of this patent is extended or adjusted under 35 U.S.C. 154(b) by 437 days.

(21) Appl. No.: 18/284,159

(22) PCT Filed: Mar. 26, 2021

(86) PCT No.: PCT/CN2021/083236
§ 371 (c)(1),
(2) Date: Sep. 26, 2023

(87) PCT Pub. No.: WO2022/198632
PCT Pub. Date: Sep. 29, 2022

(65) Prior Publication Data
US 2024/0166168 A1 May 23, 2024

(51) Int. Cl.
B60S 5/04 (2006.01)

(52) U.S. Cl.
CPC ..................................... B60S 5/046 (2013.01)

(58) Field of Classification Search
CPC ........ B60C 23/0479; B60S 5/04; B60S 5/046; B60S 5/00
See application file for complete search history.

(56) References Cited

U.S. PATENT DOCUMENTS

2015/0059918 A1    3/2015   Schondorf et al.
2017/0217261 A1    8/2017   Mays et al.
(Continued)

FOREIGN PATENT DOCUMENTS

CN          104732337 A      6/2015
CN          205876683 U      1/2017
(Continued)

OTHER PUBLICATIONS

Office Action, Japanese patent application No. 2023-559691, mailing date Mar. 13, 2025.
(Continued)

*Primary Examiner* — Timothy P. Kelly

(74) *Attorney, Agent, or Firm* — MARSHALL, GERSTEIN & BORUN LLP

(57) ABSTRACT

The present application discloses a tire maintenance method and a tire maintenance kit. The tire maintenance method comprises: establishing a communication connection between a terminal device and a maintenance device connected to a tire; displaying an interactive interface suitable for a tire maintenance mode on the terminal device; controlling the maintenance device to perform a maintenance operation designated by the tire maintenance mode on the tire based on a user input; and generating at least one of operation results of the tire on the terminal device. The present application can achieve intelligent operation.

16 Claims, 6 Drawing Sheets

(56) References Cited

U.S. PATENT DOCUMENTS

| | | | |
|---|---|---|---|
| 2019/0389435 | A1 | 12/2019 | Spindler et al. |
| 2020/0391560 | A1 | 12/2020 | Danielski et al. |
| 2021/0129802 | A1* | 5/2021 | Strong .................... F04B 49/06 |

FOREIGN PATENT DOCUMENTS

| | | | |
|---|---|---|---|
| CN | 108313024 | A | 7/2018 |
| CN | 212473407 | U | 2/2021 |
| JP | 2006234007 | A | 9/2006 |
| JP | 2006281934 | A | 10/2006 |
| JP | 2007083485 | A | 4/2007 |
| JP | 2020013331 | A | 1/2020 |

OTHER PUBLICATIONS

Japanese Application No. 2023-559691, Notice of Refusal, mailed Sep. 9, 2025.

International Application No. PCT/CN2021/083236, International Search Report, mailed Nov. 18, 2021.

Korean Application No. 10-2023-7036894, Office Action, mailed Jul. 9, 2025.

* cited by examiner

TIRE MAINTENANCE METHOD AND TIRE MAINTENANCE KIT

TECHNICAL FIELD

The present application relates to the technical field of automotive maintenance, in particular to a tire maintenance method.

The present application relates to the technical field of automotive maintenance tools, in particular to a tire maintenance kit.

BACKGROUND

When a car is running, the tires will sometimes have abnormal conditions, such as out of gas, damage, and the like. In this case, a spare tire is usually used to replace a flat or damaged tire, or rapid tire repair and inflation is provided for the tire.

A portable inflation device can provide emergency inflation services for tires. There is also a portable sealant injection device that provides temporary tire repair services for damaged tires. The sealant used in this device is a polymer composite, which is generally in a liquid state and stored in a sealing device. During the tire repair process, the sealant is pumped into the tire. At the moment when the sealant enters the tire, the sealant can reach the punctured area as the tire rotates to repair the tire. The vehicle, with its tire repaired in this way, can go to a tire repair shop for further processing.

CN211058971 U discloses a vehicle-mounted inflator pump which comprises a pump body. A liquid crystal screen is fixedly connected to the exterior of the pump body, where an external liquid crystal screen display module is used for control. The inflation item is selected, the inflation wire is connected to the tire, and manual control or mobile phone app control can be carried out through touch.

CN208252316U discloses a Bluetooth vehicle-mounted inflator pump which includes a housing, where an inflator pump is mounted inside the housing, and a Bluetooth controller is mounted on the side wall of the housing. The Bluetooth controller includes a control unit that communicates with the mobile phone and controls the inflator pump, a Bluetooth communication unit that receives mobile phone instructions and transmits them to the control unit, and a tire pressure monitor connected to the control unit.

CN209381695U discloses a tire pressure monitoring and emergency disposal device which comprises a tire pressure sensor, a tire pressure monitoring controller and a wireless communication sub-device and further comprises at least one of a movable sub-device, an air leakage point searching sub-device and a tire repair liquid spraying sub-device. The tire pressure monitoring and emergency disposal device monitors tire pressure changes in real time. When an air leakage point occurs, the tire pressure monitoring and emergency disposal device detects the position of air leakage and moves to the position of the air leakage point, where tire repair liquid is sprayed to the air leakage point through the tire repair sub-device, so that air leakage is reduced, and tire burst is prevented.

SUMMARY

One aspect of the present application provides a tire maintenance method, the method comprising: establishing a communication connection between a terminal device and a maintenance device connected to a tire; displaying an interactive interface suitable for a tire maintenance mode on the terminal device; controlling the maintenance device to perform a maintenance operation designated by the tire maintenance mode on the tire based on a user input; and generating at least one of operation results of the tire on the terminal device.

In addition to one or more of the above features, or as an alternative, other embodiment may include: when the maintenance device performs the maintenance operation designated by the tire maintenance mode on the tire, at least one state that reflects the maintenance operation is calculated and information indicating the at least one state is fed back to the terminal device.

In addition to one or more of the above features, or as an alternative, other embodiment may include: the step of calculating at least one state that reflects the maintenance operation including at least one of inputting inherent information of the tire, an input from a user through the interactive interface, inputting the real-time status of the tire, and inputting inherent information of the maintenance device.

In addition to one or more of the above features, or as an alternative, other embodiment may include: calculating tire inflation time based on tire specifications, tire initial pressure, preset tire target pressure, and operating power of the maintenance device.

In addition to one or more of the above features, or as an alternative, other embodiment may include: automatically providing the preset tire target pressure or providing the preset tire target pressure through manual settings.

In addition to one or more of the above features, or as an alternative, other embodiment may include: obtaining the inflation time through the following formula:

$$\text{the inflation time} = \text{tire volume} \times (a \times (\text{tire target pressure})^3 + b \times (\text{tire target pressure})^2 + c \times (\text{tire target pressure})) - \text{tire volume} \times (d \times (\text{tire initial pressure})^3 + e \times (\text{tire initial pressure})^2 + f \times (\text{tire initial pressure}));$$

where, a, b, c, d, e, and f are parameters determined by the operating power of the maintenance device.

In addition to one or more of the above features, or as an alternative, other embodiment may include: automatically calculating an air leakage rate and displaying a result of whether the tire is leaking on the terminal device.

In addition to one or more of the above features, or as an alternative, other embodiment may include: the tire maintenance mode at least including a first tire maintenance mode and a second tire maintenance mode, where it is determined through the user input whether to display an interactive interface suitable for the first tire maintenance mode or an interactive interface suitable for the second tire maintenance mode on the terminal device.

In addition to one or more of the above features, or as an alternative, other embodiment may include: the interactive interface suitable for the second tire maintenance mode displaying electronic instructions and/or a preformulated interactive interface that guides the user to operate the maintenance device.

In addition to one or more of the above features, or as an alternative, other embodiment may include: the first tire maintenance mode being an inflation mode, and the second tire maintenance mode being a repair mode.

In addition to one or more of the above features, or as an alternative, other embodiment may include: controlling a combination of an air compressor and a sealant bottle to perform tire repair in the repair mode, where the combination of the air compressor and the sealant bottle is connected to the tire.

In addition to one or more of the above features, or as an alternative, other embodiment may include: displaying the interactive interface suitable for the second tire maintenance mode on the terminal device including displaying an interactive interface same as the interactive interface suitable for the first tire maintenance mode.

In addition to one or more of the above features, or as an alternative, other embodiment may include: displaying instructions to the user on the terminal device to enable the users to use the tire, and calculating air leakage rate after the tire is used.

In addition to one or more of the above features, or as an alternative, other embodiment may include: displaying an interactive interface for setting vehicle information on the terminal device before displaying the interactive interface suitable for the tire maintenance mode on the terminal device.

In addition to one or more of the above features, or as an alternative, other embodiment may include: querying tire specifications, tire volume, and tire pressure standard values on the interactive interface for setting vehicle information.

In addition to one or more of the above features, or as an alternative, other embodiment may include: saving at least one of operation results of the tire, and displaying the at least one of operation results of the tire on the terminal device when reimplementing the tire maintenance method.

A second aspect of the present application provides a terminal device, on which the tire maintenance method according to any of the aforementioned embodiments is implemented.

A third aspect of the present application provides a readable storage medium on which a computer program is stored, where when the computer program is executed by a processor, the tire maintenance method according to any of the aforementioned embodiments is implemented.

A fourth aspect of the present application provides a tire maintenance kit, comprising: a maintenance device connected to a tire to be maintained; and a computer program loaded onto a terminal device, where the terminal device is operated to remotely control the maintenance device to execute the tire maintenance method according to any of the aforementioned embodiments.

In addition to one or more of the above features, or as an alternative, the maintenance device is an air compressor for tire inflation, a bottle for providing sealant to the tire, or a combination of the air compressor and the bottle.

The present application has the following beneficial effects: The present application has achieved a transformation from the traditional mechanical operation to the operation combined with intelligent applications. If a traditional inflation device is used for inflation, the parameters of the inflation have been set and cannot be changed by the user. During the operation process of the present application, tire data, maintenance device data, and maintenance operation data can all be reflected on the terminal device. Therefore, the user can be informed of the inflation time and remaining time during inflation, whether the tire is leaking, and accurately read data through the terminal device. This is particularly conducive for the maintenance operation in dark or unstable environments, and the user can stay away from these environments.

The present application, by remotely operating the maintenance device on the terminal device, replaces mechanical switches such as bridge switches arranged on the maintenance device. In addition, communication devices such as Bluetooth modules are added to the maintenance device, and the pressure gauges used to measure tire pressures are replaced with sensors. These modifications have overall reduced the number and weight of the components in the product, making it lightweight.

The present application can also inform the user through the terminal device on how to use the maintenance device, which is good for novice users or those who have forgotten how to use the device as they have not use it for a long time. The present application also provides historical records, allowing the user to compare historical records and have an understanding of the service condition of the tire.

Other aspects and features of the present application become apparent from the following detailed description with reference to the accompanying drawings. However, it should be appreciated that the drawings are designed only for the purpose of explanation, but are not to limit the scope of the present application, which should refer to the appended claims. It should also be appreciated that the drawings are intended only to conceptually illustrate the structure and process described herein, and unless otherwise specified, it is not necessary to draw the drawings to scale.

BRIEF DESCRIPTION OF DRAWINGS

The present application will be more fully understood by referring to the following detailed description of specific embodiments in combination with the drawings. The same reference numerals always denote the same elements in the drawings, where.

DETAILED DESCRIPTION

In order to help those skilled in the art to accurately understand the subject matter claimed in the present application, the specific embodiments of the present application are described in detail below in conjunction with the accompanying drawings.

Figure 1:
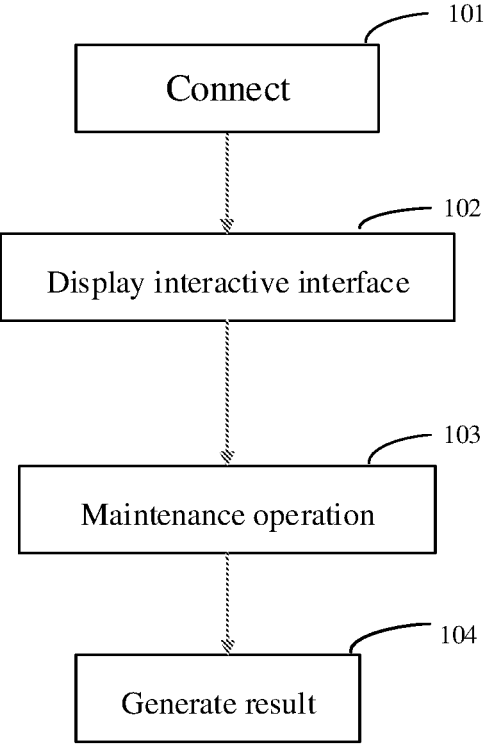
FIG. 1 is a flowchart of an embodiment of the tire maintenance method referred to in the present application.

The tire maintenance method referred to in the present application includes the steps shown in FIG. 1:

At 101, a communication connection is established between a terminal device with an interactive interface and a maintenance device connected to a tire.

The terminal device can be a mobile terminal, a hand-held terminal, an intelligent terminal, a remote control, a remote instrument, etc., and the terminal device has a human-machine interactive interface, such as a screen on a mobile phone.

At 102, an interactive interface suitable for tire maintenance mode is displayed on the terminal device.

At 103, the user inputs information based on the above interactive interface, and a tire maintenance system controls the maintenance device to perform at least one designated maintenance operation on the tire. The input can be a status of the tire during the maintenance operation, or a reference value provided by the system, which can be modified by the user through the interface. There can be one or more inputs. The input can also be a user instruction. The input can also be readable information transformed from the user instruction. The input can further include inherent information of the tire, inherent information of the maintenance device, tire parameters, maintenance device parameters, and the like. An interactive interface that meets the above input(s) can be generated. The maintenance operation is implemented based on the input(s), such as inflating the tire or pumping sealant into the tire.

At 104, at least one of operation results of the tire is generated on the terminal device. The operation results can reflect the progress of the maintenance operation, one or more states of the tire during different periods of the maintenance operation, as well as the results of tire inspection and an instruction given to the user.

The user can remotely operate the tire through the terminal device throughout the entire process, and can set various parameters for the maintenance operation. The user can also obtain various information and results of the tire through the terminal device during the maintenance operation.

There can be multiple maintenance modes. Through the interface, the user can be guided to execute a certain maintenance mode, or he can choose to directly enter a certain maintenance mode. The interface as generated includes a user input based interface, a selection interface, and a preset or customized interface, so as to enhance the user experience. Especially, this is beneficial for a novice user, avoiding misoperation and improving efficiency. For an experienced user, the interface can also provide recommended parameters based on past usage records to help user determine the settings required to perform a specific maintenance mode.

The present application also relates to a readable storage medium on which a computer program is stored. When the computer program is executed by a processor, such as by a processor of a terminal device, the method shown in FIG. 1 is implemented.

Figure 2:
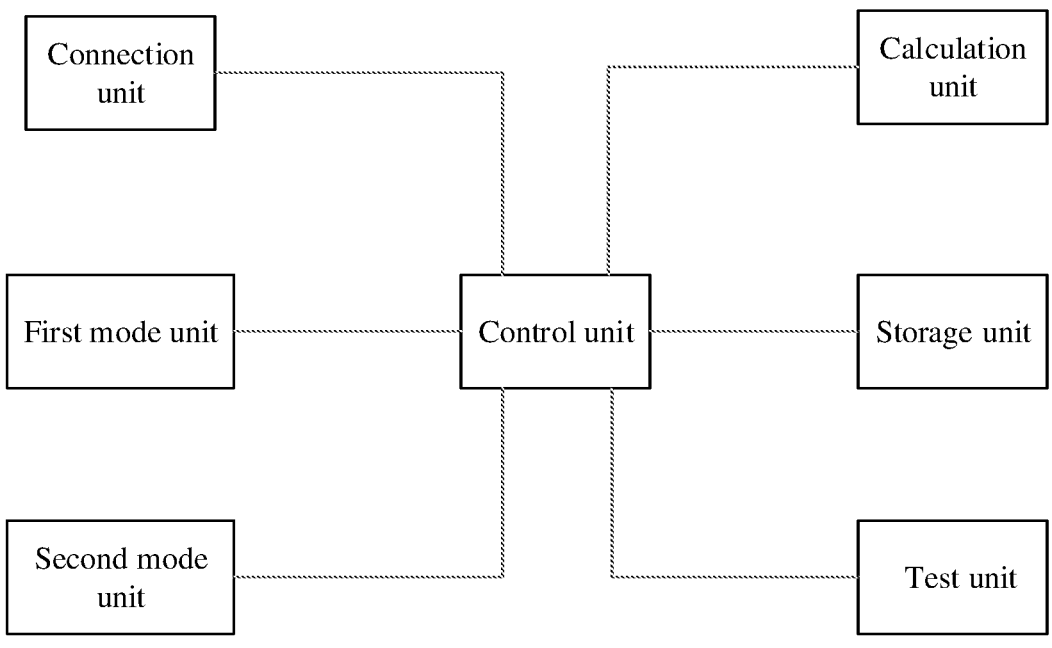
FIG. 2 is a schematic diagram of an embodiment of the tire maintenance system referred to in the present application.

FIG. 2 shows the tire maintenance system according to the present application, which comprises a control unit, and a connection unit, a first mode unit, a second mode unit, a calculation unit, a storage unit, and a test unit connected to the control unit, respectively. Among them, the connection unit is used to establish a communication connection between a terminal device with an interactive interface and a maintenance device connected to the tire. The communication connection can be a wireless connection that includes Bluetooth protocol. The first mode unit is used to perform one or more maintenance operations designated by the first tire maintenance mode on the tire, and the first mode unit displays an interface for the first tire maintenance mode on the terminal device to interact with the user. When the user inputs or sends an instruction, the first mode unit displays a new interface representing the results of the maintenance operation on the terminal device during the implementation of the maintenance operation in the first tire maintenance mode. This interface can be an interactive interface for the user to make the next input. The second mode unit is used to perform one or more maintenance operations designated by the second tire maintenance mode on the tire, and the second mode unit displays an interface for the second tire maintenance mode on the terminal device to interact with the user. When the user inputs or sends an instruction, the second mode unit displays a new interface representing the results of the maintenance operation on the terminal device during the implementation of the maintenance operation in the second tire maintenance mode. This interface can be an interactive interface for the user to make the next input. The first mode unit and the second mode unit are selectively in data connection with the control unit, or are sequentially in data connection with the control unit in series. The calculation unit is used to calculate at least one state that reflects the maintenance operation, such as tire inflation time, tire leakage rate, and the like. The storage unit is used to store electronic instructions and/or preformulated interactive interfaces to guide the user to operate the maintenance device. The storage unit is also used to store vehicle information, including but not limited to the correspondence between vehicle model and tire specifications. The test unit is used to check whether the tire meets the expected results of the maintenance operation, such as checking if there is a pressure drop in the tire. The test unit can also be used together with the calculation unit to guide the user in determining the tire repair result.

The first mode unit, the second mode unit and the test unit send data to the control unit, and the control unit sends feedbacks to the first mode unit, the second mode unit and the test unit. The control unit extracts data from the storage unit and the calculation unit.

Figure 3:
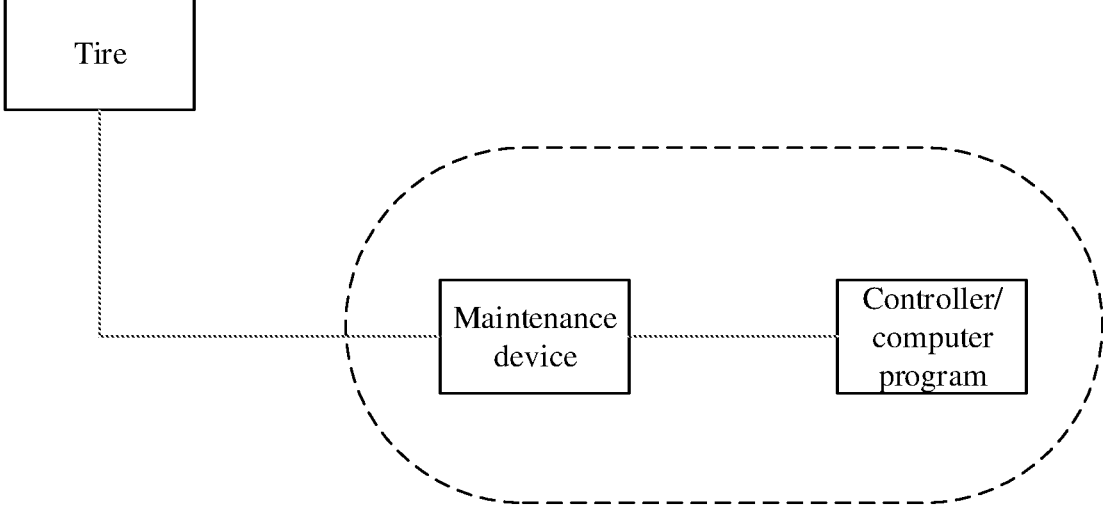
FIG. 3 is a schematic diagram of an embodiment of the tire maintenance kit referred to in the present application.

FIG. 3 shows a tire maintenance kit according to the present application, which comprises a maintenance device and a remote controller. Among them, the maintenance device can be an air compressor that inflates the tire, a sealant bottle that provides sealant for the tire, a combination of the air compressor and the sealant bottle, and the like. The sealant bottle is also known as a tire refill bottle. The remote controller can be a terminal device held by the user or connected to the terminal device. Therefore, the controller can be integrated on the terminal device, or separated from the terminal device. The controller is loaded with a computer program, or the computer program is installed on the terminal device. The maintenance device is in communication connection with the controller. The user uses the controller to remotely control the maintenance device to execute the tire maintenance method shown in FIG. 1. Or, the maintenance device is in communication connection with the terminal device, and the terminal device runs the computer program to remotely control the maintenance device to execute the tire maintenance method shown in FIG. 1.

Figure 4:
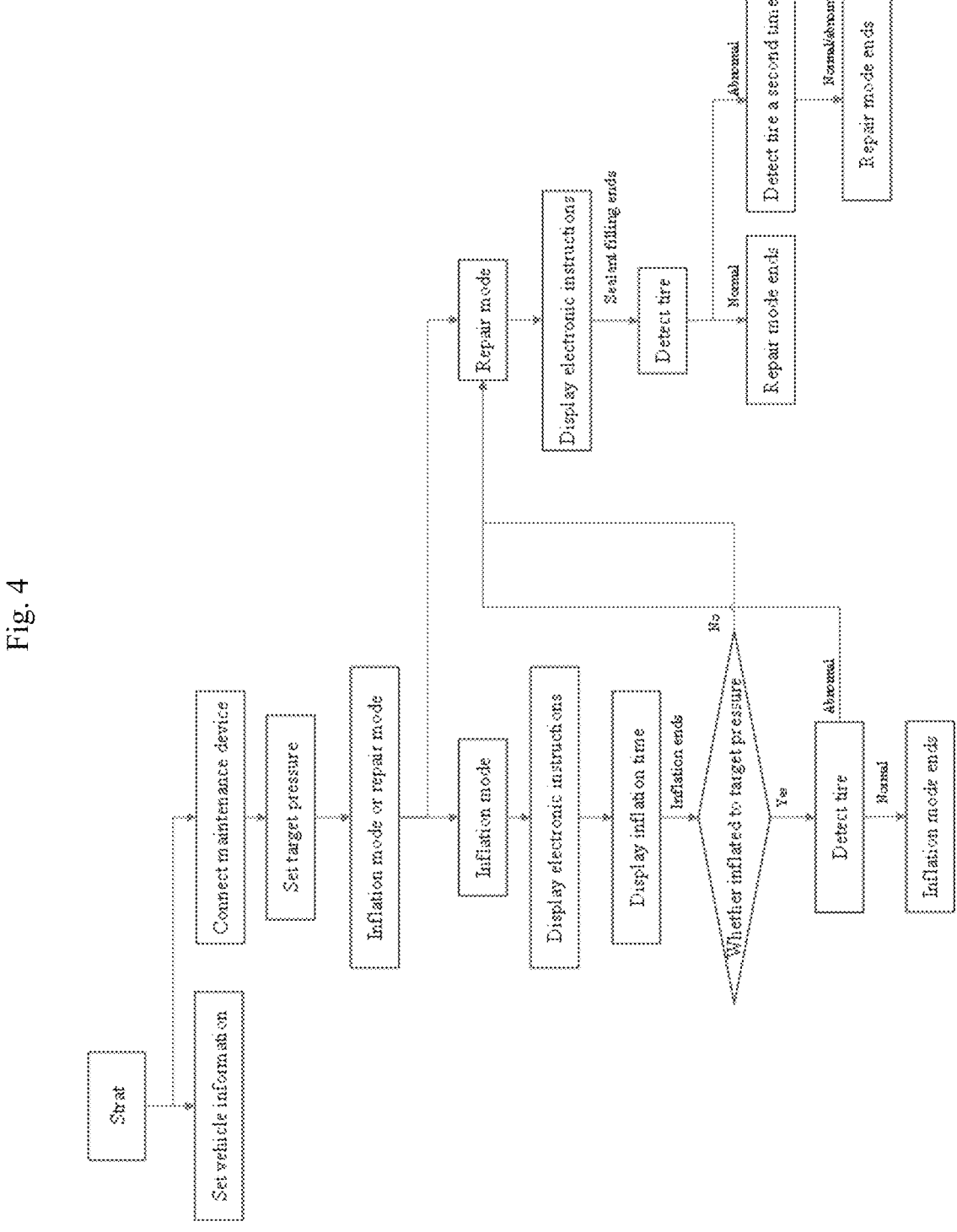
FIG. 4 is a flowchart of another embodiment of the tire maintenance method referred to in the present application.

FIG. 4 shows the process of using the tire maintenance method according to the present application.

Before implementing this method, the user first connects the maintenance device to the tire, including but not limited to connecting the hose of the maintenance device to the valve core of the tire. Turn on the wireless connection between the maintenance device and the terminal device, such as pairing the terminal device with the maintenance device through Bluetooth protocol, so as to achieve a communication connection.

The tire maintenance system for implementing the tire maintenance method is already stored on the terminal device. The user initiates, first filling in the account and password to log on.

After logging on, an interface for connecting the maintenance device will appear on the terminal device. If it is the first logon, the terminal device will display the wireless devices that are online in the surrounding area, and the user will specify the maintenance device to be connected. After the user selects the maintenance device, the terminal device will be wirelessly connected to the maintenance device.

If it is not the first logon, the terminal device will automatically search for the maintenance device, identify the name of the maintenance device that needs to be connected, and establish a communication connection with it. And then, the mode selection interface is entered.

If the terminal device cannot find the maintenance device, the system will display an interface on the terminal device to inform the user. The user will self check whether the wireless settings of the terminal device are turned on, whether the maintenance device is turned on, and whether the wireless settings of the maintenance device are turned on.

In the mode selection interface, the inflation mode and repair mode are displayed for the user to choose from. The inflation mode can be preset, which means that if not selected, the system defaults to entering the inflation mode first. It can also be that the system automatically enters the mode that needs to be operated based on the pressure drop detected. It can also be conceived that there are more or other modes for the user to choose from.

Figure 5:
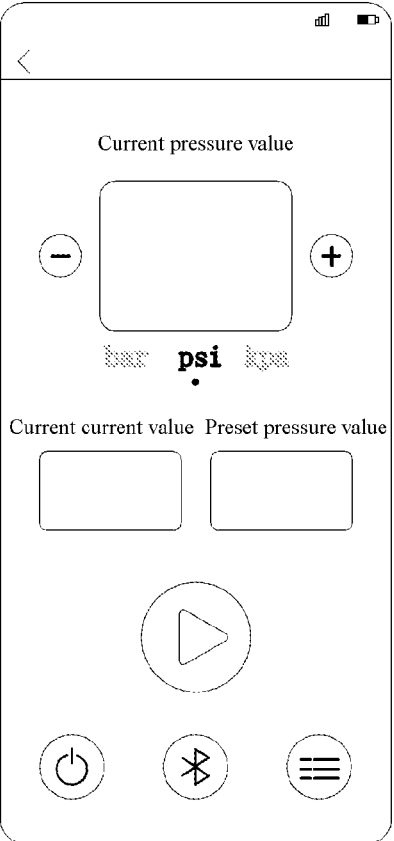
FIG. 5 is a schematic diagram of an embodiment of the interactive interface according to the present application.

After entering the inflation mode, the terminal device displays the interface shown in FIG. 5. This interface displays the current pressure value, manual pressure adjustment icon, pressure unit selection icon, current current value, preset pressure value, inflation start icon, and the like. The user can adjust the target pressure of the tire to be inflated, which is displayed through the manual pressure adjustment icons "+" and "−" in the interface. The user can also choose the appropriate pressure unit. The pressure unit includes but is not limited to bar, psi, and kpa. The system will convert based on the pressure unit selected.

Of course, the system can also provide the preset target pressure value of the tire to be inflated after entering the interface. The user can use the target pressure value recommended by the system or set it by himself.

The target pressure can also be set before entering any mode.

The interface can also display the state of the maintenance device, such as the turned-on or turned-off state, the communication connection state between the terminal device and the maintenance device, and the information settings of the vehicle and the tire, as shown at the bottom of the interface in FIG. 5. The left icon indicates whether the maintenance device is turned on, the middle icon indicates whether a Bluetooth connection is established between the terminal device and the maintenance device, and the right icon indicates that the basic information of the vehicle or tire can be set via the icon.

More information can also be provided to the user in the interface to help him have a better understanding of the tire and maintenance device, for example, the current current value can reflect the usage status of the maintenance device. It can be conceived that other information can be displayed in the interface to reflect the real-time status of the tire and maintenance device, such as fuse current specifications, which can let the user know whether the maintenance device can be safely used.

Figure 6:
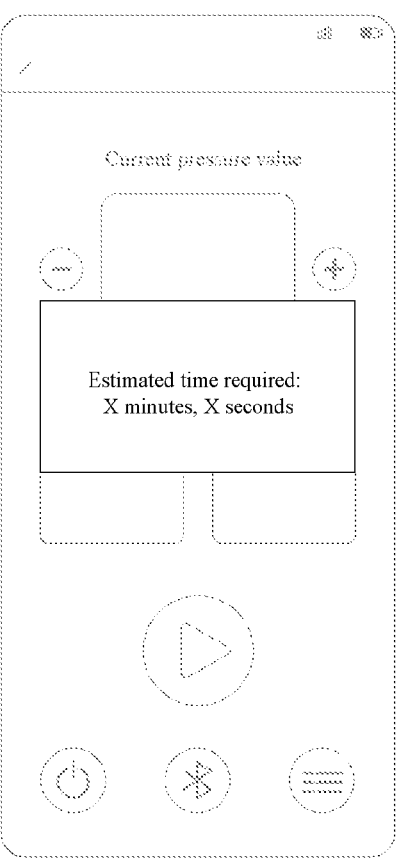
FIG. 6 is a schematic diagram of another embodiment of the interactive interface according to the present application.

After the user touches the start icon, the maintenance device begins to inflate the tire. The system provides the remaining inflation time for the inflation operation in the interface, as shown in FIG. 6.

The inflation time is calculated by the system. The system calculates inflation time based on tire volume, tire initial pressure, and tire target pressure. The inventor of the present application found that the inflation time can be estimated using a linear calculation formula. The inflation time is approximately equal to the product of volume and maintenance device performance and speed coefficient. After obtaining the tire model, the system calculates the tire volume. The maintenance device performance and speed coefficient depend on the maintenance device. After obtaining the model of the maintenance device, the maintenance device performance and speed coefficient can be obtained. The inflation time of the tire can thus be roughly estimated. In previous inflation operations, maintenance devices were unable to provide inflation time. Even at night, it was difficult for the user to read the pressure gauge pointer on the maintenance device. Therefore, the user was unaware of the inflation time. The present application provides inflation time, which can prevent the user from blindly waiting.

The inflation time is calculated by the following formula:

$$\text{Inflation time}=\text{tire volume}\times(a\times(\text{tire target pressure})^3+b\times(\text{tire target pressure})^2+c\times(\text{tire target pressure}))-\text{tire volume}\times(d\times(\text{tire initial pressure})^3+e\times(\text{tire initial pressure})^2+f\times(\text{tire initial pressure})).$$

Embodiment 1

The compressor power of the maintenance device can reflect performance and speed. When the compressor power is 96 W-120 W, $$\text{Inflation time}=\text{tire volume}\times(0.0024\times(\text{tire target pressure})^3+0.000006\times(\text{tire target pressure})^2+0.0507\times(\text{tire target pressure}))-\text{tire volume}\times(0.0024\times(\text{tire initial pressure})^3+0.000006\times(\text{tire initial pressure})^2+0.0507\times(\text{tire initial pressure})).$$

The tire volume is 36 L, the initial pressure is 0, the target pressure is 2.5 bar, and the inflation time is 5.91 min.

The tire volume can be obtained by tire model. The initial pressure is detected by the sensor.

Embodiment 2

When the compressor power of the maintenance device is 120 W-180 W, $$\text{Inflation time}=\text{tire volume}\times(0.0007\times(\text{tire target pressure})^3+0.0027\times(\text{tire target pressure})^2+0.0344\times(\text{tire target pressure}))-\text{tire volume}\times(0.0007\times(\text{tire initial pressure})^3+0.0027\times(\text{tire initial pressure})^2+0.0344\times(\text{tire initial pressure})).$$

The tire volume is 36 L, the initial pressure is 0, the target pressure is 2.5 bar, and the inflation time is 4.10 min.

Embodiment 3

When the compressor power of the maintenance device is 180 W-240 W, $$\text{Inflation time}=\text{tire volume}\times(0.0007\times(\text{tire target pressure})^3+0.001\times(\text{tire target pressure})^2+0.0197\times(\text{tire target pressure}))-\text{tire volume}\times(0.0007\times(\text{tire initial pressure})^3+0.001\times(\text{tire initial pressure})^2+0.0197\times(\text{tire initial pressure})).$$

The tire volume is 36 L, the initial pressure is 0, the target pressure is 2.5 bar, and the inflation time is 2.39 minutes.

After the tire is inflated to the target pressure, the system detects whether the tire is leaking and displays a prompt through the interface that a leakage detection is in progress. When the tire cannot be inflated to the target pressure, the system displays electronic instructions, asking the user whether to repair the tire.

Compare the pressure drop rate/leakage rate of the tire with a threshold, where the pressure drop rate refers to, for example, change in tire pressure per unit time. When the calculated value is greater than the threshold, it indicates tire leakage.

If there is air leakage, the system displays a prompt of air leakage through the interface and asks the user whether to repair the tire.

If there is no air leakage, the system displays a prompt that the tire is normal through the interface and informs the user to remove the maintenance device.

The function of leakage detection allows the user to learn in a timely manner whether there is still an air leakage after inflation or whether it is necessary to switch to the repair mode, and inform the user of the repair results, allowing the user to drive safely.

After the user inputs 'yes', the system enters the repair mode and displays a relevant interface.

If the user selects the repair mode in the mode selection interface, the system will directly enter the repair mode and display a same interface as the relevant interface.

The system can display electronic instructions in the interface to guide the user to operate the maintenance device, including but not limited to removing the maintenance device that has conducted the inflation operation and installing an other maintenance device for the repair operation; or, adding a component to the current maintenance device, such as connecting the hose of the sealant bottle to the valve core of the tire, and connecting the air compressor to the sealant bottle. The air compressor pumps air into the sealant bottle, forcing the sealant inside the sealant bottle to flow through the hose to the tire, thereby quickly filling the inner space after entering the tire. Or, for an air compressor integrated with a sealant bottle, the air compressor is instructed to switch from the inflation mode to the repair mode. Electronic instructions can be displayed in various ways such as in the form of text, graphics, sound, and the like.

The electronic instructions can be displayed immediately after entering any mode.

After performing a series of steps, the user clicks on "Next" in the interface to enter the settings interface of the repair mode.

This interface can be the same as the interface of the inflation mode, as shown in FIG. 5. The user can reset the tire target pressure. The setting method is similar to that of the inflation mode. The user can define the tire target pressure by himself, or determine the tire target pressure based on the system's calculation results.

After the user clicks on the start icon, the maintenance device starts working and the sealant is pumped into the tire. When the tire pressure reaches the target pressure, the sealant filling is completed, and the system starts to detect tire leakage.

The user is prompted through the display in the interface to drive for several kilometers. According to the tire repair manual and requirements, it is necessary to drive a certain number of kilometers, for example but not restrictedly, 5 kilometers, to verify whether the tire repair is successful.

At this prompt, the user removes the maintenance device and drives for 5 kilometers. The interface or the instrument panel in the vehicle can display the distance of the driving.

When the vehicle comes to a stop, the system detects whether the tire is leaking air. This leakage detection method is similar to the leakage detection in the inflation mode. If the tire pressure does not drop, it indicates that the tire repair has been successful, and the system prompts the user through the interface.

If the tire pressure drops, the system informs the user through the interface, and the user can try driving for another 5 kilometers to perform a second inspection. If the tire pressure does not drop after this inspection, the tire repair is successful. However, if the system detects a further drop in tire pressure, the tire repair fails and the user is prompted to call for road search and rescue.

The repair mode ends.

Figure 7:
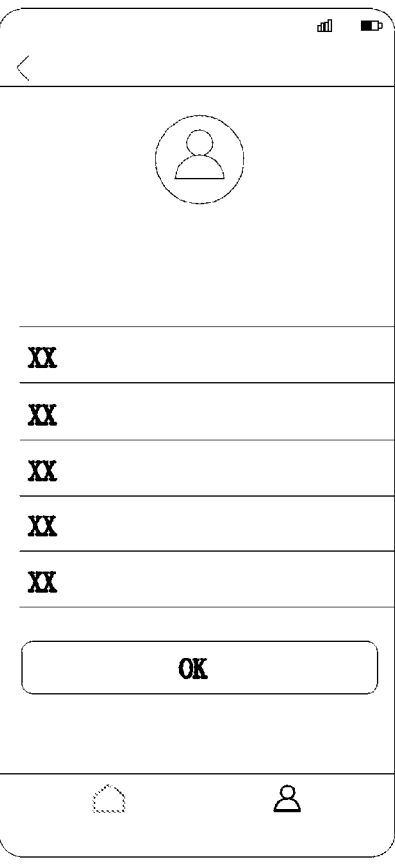
FIG. 7 is a schematic diagram of yet another embodiment of the interactive interface according to the present application.

The system can also configure the interface using vehicle information, allowing the user to input vehicle information, including but not limited to vehicle brand, vehicle model, tire specifications, tire volume, tire pressure standard values, etc., as shown in FIG. 7. The system can be configured with a storage unit and a calculation unit. After obtaining tire specifications, relevant tire information can be extracted from the storage unit, and the calculation unit can calculate the volume of the tire. The system can recommend the tire pressure standard value to the user as the tire target pressure. The tire pressure standard value can be obtained from the user manual, fuel tank cap, or can be read at the door of the vehicle.

The system can also provide a historical record interface to inform the user of a past usage history, including but not limited to the number of times a specific tire has been inflated and repaired, the past inflation time, the past repair time, the tire target pressure values and tire initial pressure values of past inflations, and the like, so as to allow the user to understand the service conditions of the tire and the maintenance device, compare historical records, and determine the current operation input by referring to historical records.

Although the specific embodiments of the present application have been illustrated and described in detail to explain the principle of the present application, it should be understood, however, that the present application can be implemented in other ways without departing from the principle.

In optional embodiments, the number of first guide slot 16b may be provided as being greater than one and be evenly distributed along the circumference of the first round hole 16a. Two first guide slots 16b are shown in the illustrated example, and the two first guide slots 16b are distributed diametrically opposite along the first round hole 16a. It is understood that in other embodiments, if there are three, four, etc. first guide slots 16a, they may be evenly distributed every 120 degrees, 90 degrees, etc. circumferentially. A non-uniform distribution is also allowed.

In the illustrated embodiment, the first end wall 12 may also have a first circumferential limit notch 19a formed at the circumference of the first round hole 16a. It will be appreciated that, depending on the specific embodiment, the first circumferential limit notch 19a may not be provided, or a greater number of the first circumferential limit notches 19a may also be provided. The effects thereof are set forth below in conjunction with FIGS. 8-10.

As shown in FIG. 2, the connector 10 may also have a second end wall 13. A second through hole 17 may be provided in the second end wall 13, the second through hole 17 communicates the interior cavity 14 with the exterior of the connector 10. According to the illustrated embodiment, the second through hole 17 includes a second round hole 17a and a second guide slot 17b on the periphery of the first round hole 17a.

In optional embodiments, the number of second guide slot 17b may be provided as being greater than one and be evenly distributed along the circumference of the second round hole 17a. Two second guide slots 17b are shown in the illustrated example, and two second guide slots 17b are distributed diametrically opposite along the second round hole 17b. It is understood that in other embodiments, if there are three, four, etc. second guide slots 17b, they may be distributed every 120 degrees, 90 degrees, etc. circumferentially. A non-uniform distribution is also allowed.

It will be appreciated that the shape, size, angular position of distribution, etc. of the second through hole 17 on the second end wall 13 is not necessarily the same as the shape, size, angular position of distribution, etc. of the first through hole 16 on the first end wall 12.

In the illustrated embodiment, the second end wall 13 may also have a second circumferential limit notch 19b formed at the circumference of the second round hole 17a. It will be appreciated that, depending on the specific embodiment, the second circumferential limit notch 19b may not be provided, or a greater number of the second circumferential limit notches 19b may also be provided. The bonding and working principle of the second circumferential limit notch 19b is similar to the first circumferential limit notch 19a.

It will be appreciated that in optional embodiments, the first through hole 16 and the second through hole 17 are not limited to the specific shape as shown in the figure. For example, the axial connection function can be achieved as long as the first through hole 16 and the second through hole 17 are non-circular in shape.

FIG. 5 is a cross-sectional view taken along line A-A in FIG. 2. FIG. 6 is a cross-sectional view taken along line B-B in FIG. 3. FIG. 7 is a cross-sectional view taken along line C-C in FIG. 4.

As can be seen in conjunction with these cross-sectional views, in this embodiment, the first end wall 12 may be provided with a first protrusion 18 at a distance from the first guide slot 16b circumferentially on one side within interior cavity 14.

Similarly, it may be understood that in optional embodiments, the second end wall 13 may also be provided with a second protrusion (not illustrated) at a distance from the second guide slot 17b circumferentially on one side within the interior cavity 14.

As may also be seen from FIGS. 5 and 6, in this embodiment, the thicknesses of the first end wall 12 and the second end wall 13 are not the same. As may be understood, in optional embodiments, the respective thicknesses of the first end wall 12, the second end wall 13, and the circumferential side wall 11 may be designed according to specific needs, for example taking into consideration various circumstances such as, but not limited to, connection strength, manufacturing material, installation space, and the like.

One aspect of the invention also provides a connecting assembly comprising the connector of any of the foregoing embodiments. The connecting assembly may further include a first connecting joint on the first component to be connected (not illustrated) that conforms to the shape of the first through hole and a second connecting joint on the second component to be connected (not illustrated) that conforms to the shape of the second through hole. The shapes of the first and second through holes are adapted to be non-circular in shape such that the first connecting joint may be adapted to enter the interior cavity through the first through hole, the second connecting joint may be adapted to enter the interior cavity through the second through hole, and they engage the first end wall and the second end wall, respectively, within the interior cavity after the connector is rotated by an angle, thereby enabling a reliable axial connection between the first component to be connected and the second component to be connected.

The structures, principles, and advantages of the connecting assembly of this aspect will be more readily understood in conjunction with the examples of the connecting assembly in FIGS. 8-10.

FIG. 8 is a schematic view of a connecting assembly according to one embodiment of the present invention, with the connecting assembly is in a disassembled state. FIG. 9 is a schematic view of the connecting assembly of FIG. 8 with the connecting assembly in a connected state. FIG. 10 is a cross-sectional view of the connecting assembly in FIG. 9 in a connected state.

As illustrated in the figures, the connecting assembly 100 may include the connector 10 as in any of the foregoing embodiments. In addition, the connecting assembly 100 further includes a first connecting joint 20 on the first component to be connected (not illustrated) that conforms to the shape of the first through hole 16 of the connector 10 and a second connecting joint 30 on the second component to be connected (not illustrated) that conforms to the shape of the second through hole 17.

More specifically, illustrated in FIGS. 8-10 is a connecting assembly in a tire repairing machine, wherein the first component to be connected is a tire repairing liquid connecting tube 210 in a tire repairing machine (see FIG. 12), and the second component to be connected is a valve body 220 in a tire repairing machine (see FIG. 12).

As can be seen from the figures, in this embodiment, the first connecting joint 20 may include a first cylindrical portion 21 having a first open end and a first lug 22 provided on the first cylindrical portion; the second connecting joint 30 may have a second cylindrical portion 31 including a second open end and a second lug 32 provided on the second cylindrical portion; a first circumferential limiting protrusion 23 may be formed on the outer periphery of the first cylindrical portion 21; a second circumferential limiting protrusion 33 may be formed on the outer periphery of the second cylindrical portion 31.

As can be understood in connection with FIGS. 8-10, the shapes of first cylindrical portion 21 and the first lug 22 of the first connecting joint 20 conform to that of the first round hole 16a and the first guide slot 16b of the connector 10, respectively. When a connection is desired, the first cylindrical portion 21 and the first lug 22 may be made through the first round hole 16a and the first guide slot 16b, after which the first lug 22 may be engaged within the interior cavity on the inside surface of the first end wall 12 after rotating the connector 10 by an angle, to realize an axial connection between the first connecting joint 20 and the connector 10. In the illustrated example, the connector 10 is rotated 90 degrees to enable a reliable connection.

Similarly, the shapes of the second cylindrical portion 31 and the second lug 32 of the second connecting joint 30 conform to that of the second round hole 17a and the second guide slot 17b of the connector 10, respectively. When a connection is desired, the second cylindrical portion 31 and the second lug 32 may be made through the second round hole 17a and the second guide slot 17b, after which the second lug 32 may be engaged within the interior cavity on the inside surface of the second end wall 13 after rotating the connecter 10 by an angle, to realize the connection between the second connecting joint 30 and the connector 10.

It will be appreciated that in actual operation, the first connecting joint 20 and the second connecting joint 30 may firstly reach into the connector 10, and then the connector 10 is rotated by an angle to achieve the connection.

The first protrusion 18 inside the first end wall 12 is described above in connection with FIGS. 5 and 7, and a second protrusion inside the second end wall 13 is mentioned. When the first and second lugs 22, 32 are engaged in the connector 10, the first and second protrusions may define a circumferential engagement position of the connector relative to the first and second connecting joint by engaging the first and second lugs, respectively, enabling them to be effectively engaged with the first and second end walls of the connector 10. Specifically, the first and second lugs will block the first and second protrusions when the connector is rotated to an appropriate circumferential position, thereby limiting further relative rotation of the connector relative to the first connecting joint and/or the second connecting joint, retaining it in the optimal connection position. It may be understood that regardless of the number of first and second lugs, only one first protrusion and/or only one second protrusion may be provided, and a good positioning effect can also be achieved.

As shown in FIG. 10, since the first component to be connected in this embodiment is a tire repairing liquid connecting tube in a tire repairing machine and the second component to be connected is a valve body in a tire repairing machine, the first connecting joint 20 may have a first open end and the second connecting joint 30 may have a second open end. Specifically, in this embodiment, the first open end is located at the end of the first cylindrical portion 21 and the second open end is located at the end of the second cylindrical portion 31. Thus, in the state where the first connecting joint 20 and the second connecting joint 30 are engaged with the connector 10, the first open end of the first connector may sealingly reach into the second open end of the second connecting joint such that the first open end and the second open end may be connected to form a fluid pathway.

FIG. 11 is a schematic view of one connecting joint in the connecting assembly of FIG. 8. As can be seen from FIG. 11, a ring of groove 24 may be provided on the outer circumference of the first cylindrical portion of the first connecting joint 20 near the distal end, and may be used to embed a seal ring 40 therein (see FIG. 10) to enable fluid sealing with the inner circumference of the second connecting joint 30, preventing media from leaking and ensuring reliable operation of the connection portion.

In FIGS. 8 and 11, a first circumferential limiting protrusion 23 and a second circumferential limiting protrusion 33 are provided on the outer peripheral sides of the first connecting joint 20 and the second connecting joint 30, respectively. When the first connecting joint 20 is connected to the connector 10, the first connecting joint 20 firstly reaches into the first through hole 16 of the connector 10, and then the connector 10 is rotated in a set direction, and when engaged in place, the first circumferential limiting protrusion 23 may be snapped slightly into the first circumferential limit notch 19a in the first round hole 16a of the first end wall 12, producing a in-place feeling as an indication of alignment. It will be appreciated that a similar design applies equally to the second circumferential limiting protrusion of the second connecting joint 33 and the second circumferential limit notch 19b in the first round hole 17a of the second end wall 12. The number of the first circumferential limiting protrusion and the second circumferential limiting protrusion is adapted to be correspondent with the number and the circumferential distribution positions of first circumferential limit notches and the second circumferential limit notches, respectively.

It is to be noted here that, when the first through hole of the first end wall and/or the second through hole of the second end wall are of other non-circular shapes, such as oval, polygonal, irregular shapes and the like, the first connecting joint and the second connecting joint may also employ corresponding shapes to allow the first connecting joint and the second connecting joint to pass through the first through hole and the second through hole, and to form a reliable axial connection by engaging the joints with the insides of the first end wall and the second end wall after the connector is rotated by a certain angle.

It will be appreciated that in optional embodiments, when the connecting assembly is not used in a tire repairing machine, it may also be provided with respective features such as a first open end, a second open end, and the like, to be adapted to reliably deliver fluid.

Another aspect of the invention provides a tire repairing machine. The tire repairing machine may be provided with the connecting assembly as described in any of the foregoing embodiments.

For example, in an optional embodiment, the tire repairing machine may have a valve body, a tire repairing liquid connecting tube, and an air compressor connecting tube, the tire repairing liquid connecting tube and an air compressor connecting tube may be connected to the dispensing nozzle of the tire repairing machine through the valve body, respectively, and the tire repairing liquid connecting tube and the valve body may be connected by a connecting assembly therebetween. At this time, the tire repairing liquid connecting tube and the valve body may serve as a first component to be connected and a second component to be connected respectively. It can be seen that, such arrangement is for a dual purpose tire repairing machine that, through its dispensing nozzle, it can both dispense the tire repairing liquid to repair a tire and can also dispense air to inflate the tire.

FIG. 12 shows a schematic view of the dispensing mechanism of the tire repairing machine of this embodiment.

According to the example in the figure, in the dispensing mechanism 200, one end of the tire repairing liquid connecting tube 210 and one end of the air compressor connecting tube 230 are connected to the valve body 220, respectively. The other end of the tire repairing liquid connecting tube 210 may be connected to a tire repairing liquid vessel (not illustrated), and the other end of the air compressor connecting tube 230 may be connected to an air compressor (not illustrated). The valve body 220 may be provided therein with a plug 260 that is capable of sliding back and forth within the valve body 220, thereby enabling the switch of the valve body communication between the tire repairing liquid vessel and the air compressor. When the pressure at the air compressor connecting tube 230 is greater than the pressure at the tire repairing liquid connecting tube 210, the plug 260 moves to the tire repairing liquid connecting tube 210, and the dispensing nozzle 250 is adapted to inflate the tire; when the pressure at the air compressor connecting tube 230 is smaller than the pressure at the tire repairing liquid connecting tube 210, the plug 260 moves to the air compressor connecting tube 230, and the dispensing nozzle 250 is adapted to dispense the tire repairing liquid to perform the tire repairing operation.

In FIG. 12, the connection between the tire repairing liquid connecting tube 210 and the valve body 220 advantageously employs the connecting assembly of the aforementioned embodiments of the present invention, with the connector 240 connected between the tire repairing liquid connecting tube 210 and the valve body 220. For this simple structural design for the sealing assembly and disassembly of the tire repairing liquid connecting tube and the valve body, convenience is provided for assembly and disassembly in a small space of products such as the tire repairing machine.

It will be appreciated that while the present specification describes the application of connectors and connecting assemblies in connection with the example of a tire repairing machine, the connectors and connecting assemblies required with respect to the present application are not limited to being used in a tire repairing machine, but are applicable to any device requiring axial connection.

The technical scope of the invention is not limited to merely the content in the above specification, and those skilled in the art may perform various variations and modifications to the above-described embodiments without departing from the technical idea of the invention, and all the variations and modifications should be within the scope of the invention.

What is claimed is:

1. A tire maintenance method, comprising:
establishing a communication connection between a terminal device and a maintenance device connected to a tire;
displaying an interactive interface suitable for a tire maintenance mode on the terminal device;
controlling the maintenance device to perform a maintenance operation designated by the tire maintenance mode on the tire based on a user input; and
generating at least one of operation results of the tire on the terminal device,
wherein when the maintenance device performs the maintenance operation designated by the tire maintenance mode on the tire, at least one state that reflects the maintenance operation is calculated and information indicating the at least one state is fed back to the terminal device,
a tire inflation time is calculated based on tire specifications, tire initial pressure, preset tire target pressure, and operating power of the maintenance device, and the preset tire target pressure is automatically provided, or is provided through manual settings, and
the inflation time is obtained through the following formula:

$$\text{the inflation time}=\text{tire volume}\times(a\times(\text{tire target pressure})^3+b\times(\text{tire target pressure})^2+c\times(\text{tire target pressure}))-\text{tire volume}\times(d\times(\text{tire initial pressure})^3+e\times(\text{tire initial pressure})^2+f\times(\text{tire initial pressure}));$$

where, a, b, c, d, e, and f are parameters determined by the operating power of the maintenance device.

2. The tire maintenance method according to claim 1, wherein the step of calculating at least one state that reflects the maintenance operation includes at least one of inputting inherent information of the tire, an input from a user through the interactive interface, inputting the real-time status of the tire, and inputting inherent information of the maintenance device.

3. The tire maintenance method according to claim 1, wherein an air leakage rate is automatically calculated and a calculation result is displayed on the terminal device.

4. The tire maintenance method according to claim 1, wherein the tire maintenance mode at least includes a first tire maintenance mode and a second tire maintenance mode, where it is determined through the user input whether to display an interactive interface suitable for the first tire maintenance mode or an interactive interface suitable for the second tire maintenance mode on the terminal device.

5. The tire maintenance method according to claim 4, wherein the interactive interface suitable for the second tire maintenance mode displays electronic instructions and/or a preformulated interactive interface that guides the user to operate the maintenance device.

6. The tire maintenance method according to claim 4, wherein the first tire maintenance mode is an inflation mode, and the second tire maintenance mode is a repair mode.

7. The tire maintenance method according to claim 6, wherein a combination of an air compressor and a sealant bottle is controlled to perform tire repair in the repair mode, where the combination of the air compressor and the sealant bottle is connected to the tire.

8. The tire maintenance method according to claim 4, wherein displaying the interactive interface suitable for the second tire maintenance mode on the terminal device includes displaying an interactive interface same as the interactive interface suitable for the first tire maintenance mode.

9. The tire maintenance method according to claim 8, wherein instructions are displayed to the user on the terminal device to enable the user to use the tire and calculate air leakage rate after the tire is used.

10. The tire maintenance method according to claim 1, wherein before the step of displaying the interactive interface suitable for a tire maintenance mode on the terminal device, an interactive interface for setting vehicle information is displayed on the terminal device.

11. The tire maintenance method according to claim 10, wherein tire specifications, tire volume, and tire pressure standard values are queried on the interactive interface for setting vehicle information.

12. The tire maintenance method according to claim 1, wherein at least one of operation results of the tire is saved, and the at least one of operation results of the tire is displayed on the terminal device when the tire maintenance method is reimplemented.

13. A non-transitory readable storage medium on which a computer program is stored, wherein when the computer program is executed by a processor, the tire maintenance method according to claim 1 is implemented.

14. A terminal device comprising the non-transitory readable storage medium of claim 13.

15. A tire maintenance kit, comprising:
a maintenance device connected to a tire to be maintained; and
a terminal device comprising the non-transitory readable storage medium of claim 13,
wherein the terminal device is operated to remotely control the maintenance device to execute the tire maintenance method.

16. The tire maintenance kit according to claim 15, wherein the maintenance device is an air compressor for tire inflation, a bottle for providing sealant to the tire, or a combination of the air compressor and the bottle.

* * * * *